United States Patent

[11] 3,590,167

[72] Inventors David D. Price, Jr.
Oklahoma City, Okla.;
Carl A. Helber, Tempe, Ark.

[21] Appl. No. 764,105
[22] Filed Oct. 1, 1968
[45] Patented June 29, 1971
[73] Assignee Economy Company
Oklahoma City, Okla.
by said Helber

[54] SOLID-STATE CONTROL CIRCUITRY FOR AUDIO INFORMATION PLAYBACK APPARATUS
2 Claims, 1 Drawing Fig.

[52] U.S. Cl. .......... 179/100.2
[51] Int. Cl. .......... G11b 15/06
[50] Field of Search .......... 179/100.2 S, 100.2 MI, 100.1 VC

[56] References Cited
UNITED STATES PATENTS
3,084,226 4/1963 Moulic .......... 179/100.2

*Primary Examiner*—Bernard Konick
*Assistant Examiner*—Robert S. Tupper
*Attorney*—Dunlap, Laney, Hessin & Dougherty

ABSTRACT: An apparatus for the operation and control of a record playback teaching device, the apparatus consisting of electrical circuitry for playing back information from a dual-channel record whereby one channel carries pertinent tutoring information while the other channel carries attendant control signals intermittently recorded therealong. A first playback circuit transduces and amplifies the audio information for reproduction through an audible presentation device, while a second channel transduces and amplifies a control actuation signal upon occurrence for the purpose of controlling application of drive power to the record playback mechanism.

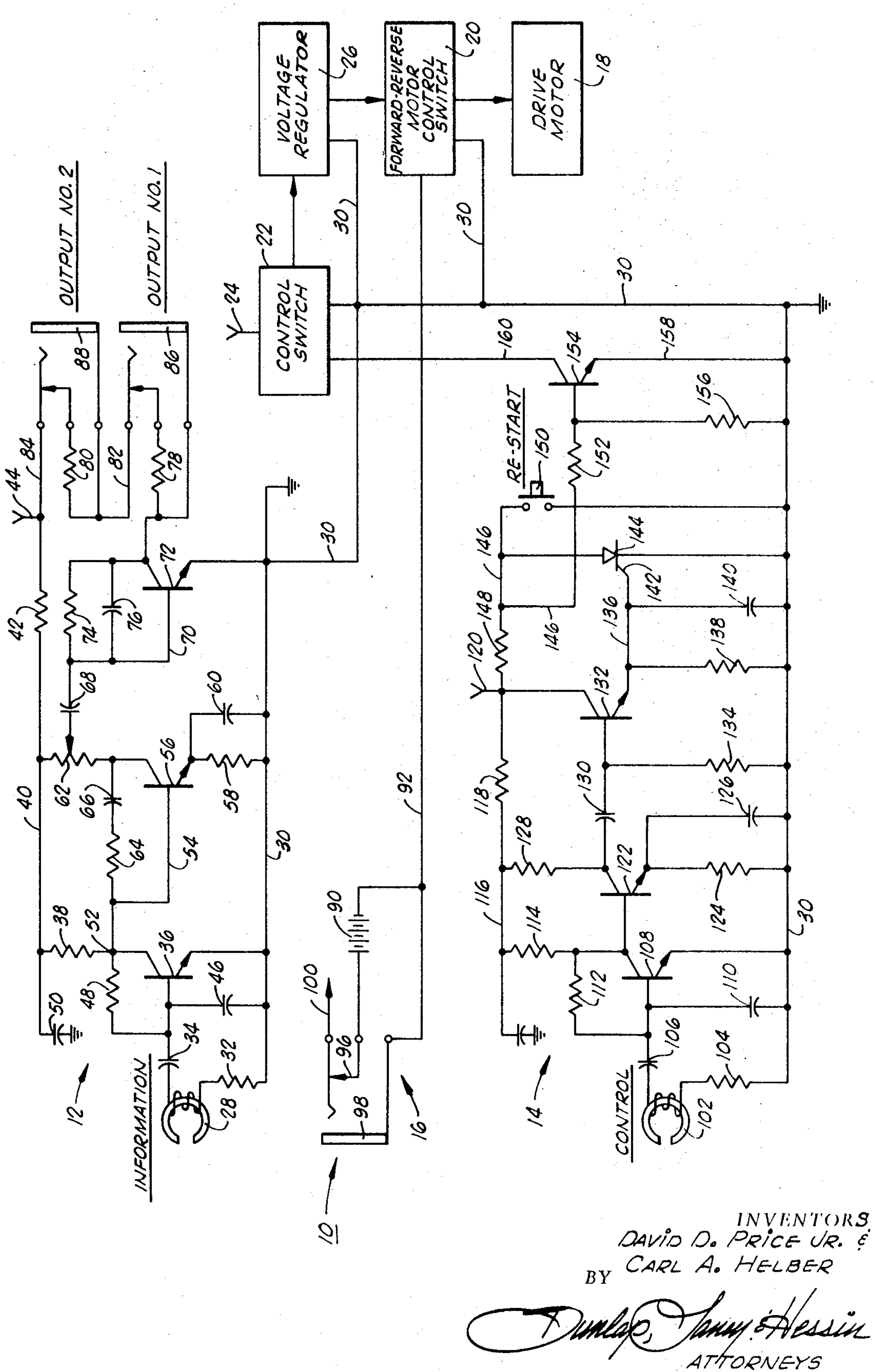
INVENTORS
DAVID D. PRICE JR. &
CARL A. HELBER
BY
Dunlap, Laney, Hessin
ATTORNEYS

SOLID-STATE CONTROL CIRCUITRY FOR AUDIO INFORMATION PLAYBACK APPARATUS

BACKGROUND OF THE INVENTION

1. Field of the Invention

The invention relates generally to electronic teaching devices and, more particularly, but not by way of limitation, it relates to improved tutoring playback apparatus for use with educational tape recordings of selected format.

2. Description of the Prior Art

The prior art includes various types of record playback mechanism, many types of which are intended for specified purposes and respond to plural channel records to produce varied data outputs. While numerous circuits have been proposed for application in the operation and control of record playback mechanisms, it is a relatively recent development trend to attempt design of certain circuitry for low-cost applications in tutoring playback apparatus as well as in other educational training aids. The low-cost versus reliability aspects of such development takes on particular importance upon consideration of the large market volume and the necessity for foolproof operation by a multitude of users having varied capabilities.

SUMMARY OF THE INVENTION

The present invention contemplates an intermittently controllable teaching machine which plays back an information channel in response to control actuation from an associated control channel on the same record. In a more limited aspect, the invention consists of a record playback device for playing back dual-channel records, one channel providing input to an amplifier and an audible output circuit, while the remaining control channel provides signal output for amplification and control of application of drive power to the tape playback drive mechanism. In particular, the invention discloses novel drive control circuitry for controlling periodic application of drive power from a regulated voltage supply to energize the playback mechanism.

Therefore, it is an object of the present invention to provide an automatic tutoring device which is economical and reliable of construction.

It is also an object of the invention to provide such a tutoring device utilizing prerecorded, dual-channel instructional material which can be utilized quickly and easily with a minimum probability of failure or breakage.

It is an additional object of the present invention to provide control circuitry for automatic tutoring playback apparatus which circuitry offers the advantages of increased reliability at reduced costs.

Finally, it is an object of the present invention to provide a teaching machine capable of construction as a low-cost and compact automatic unit.

Other objects and advantages of the invention will be evident from the following detailed description when read in conjunction with the accompanying drawing which illustrates the invention.

BRIEF DESCRIPTION OF THE DRAWING

The single sheet of drawing is a schematic diagram of control circuitry constructed in accordance with the present invention.

DETAILED DESCRIPTION OF THE PREFERRED EMBODIMENT

The control circuitry 10 consists of information circuits 12 and control circuits 14 as well as a primary energizer or power source 16. The control circuitry 10 is utilized with a dual-channel record playback mechanism which may be of conventional type and which is, in this instance, utilized as a teaching machine. Thus, it is contemplated that the invention in one form will utilize a commercially available tape playback transport, for example, a Norelco Model No. 1607-8, this transport effecting playback of such as a "Compact Casette" C-60 dual-channel record tape which is also commercially available from the North American Phillips Company, Inc. of New York, N.Y.

The tape transport (not specifically shown) will consist of a reversible drive motor 18 which is controlled through a forward-reverse motor control switch 20 as will be further described. Thus, in the case of the Norelco tape transport unit above mentioned, a reversible DC motor-type ELZ 3302/91 is utilized to effect "forward tape drive/fast forward/fast reverse" tape transport actuation. Energization of drive motor 18 is effected by control switch 22 to apply DC voltage from input 24 through voltage regulator 26 and motor control switch 20. It should be further understood, that while the Norelco transport and drive system is specifically referred to, there are various other commercially available tape units which are capable of playing back dual-channel records, and which may be utilized with the present control circuitry 10.

Information or tutoring data is played back from a first channel of the dual-channel tape by means of a magnetic pickup head 28 of conventional type. The magnetic head 28 is biased from a ground buss 30 by means of a resistor 32 and it is then connected through a coupling capacitor 34 for input to the base of an NPN-type transistor 36. The transistor 36 is connected common emitter with the emitter connected to ground buss 30 and the collector connected through a load resistor 38, lead 40 and a series load resistor 42 to a DC supply voltage input 44. The base of transistor 36 is connected through a capacitor 46 to ground and a resistor 48 is connected between collector and base. Also, a decoupling capacitor 50 is connected from the positive voltage supply lead 40 to ground.

An amplified signal output is taken off from a collector junction 52 of transistor 36 for input via lead 54 directly to the base of an NPN-type transistor 56. The emitter of transistor 56 is connected through a resistor 58 and parallel-connected filter capacitor 60 to ground while the collector 62 is connected through a potentiometer 62, the volume control potentiometer, to the voltage supply lead 40, load resistor 42 and voltage supply 44. A resistor 64 is connected in series with capacitor 66 and between the collector and base lead 54 to provide frequency equalization.

Amplified output from the collector of transistor 56 is taken through a volume control potentiometer 62 and coupling capacitor 68 for input via base lead 70 to the base of an NPN-type transistor 72. The emitter of transistor 72 is connected directly to ground wire 30 and a biasing resistor 74 with a decoupling capacitor 76 are connected between the collector and base lead 70. The output from transistor 72 is developed across each of the series load resistors 78 and 80 which are connected by means of jack leads 82 and 84 into a series circuit energized by voltage source 44. Either of the load resistors 78 or 80 is bypassed by the plugging-in of the appropriate jack (not shown) to the respective output receptacles 86 and 88.

The energizing source 16 is normally comprised of a DC source such as a 7.5 volt DC battery 90 having its negative terminal connected to a common lead 92 and having its positive terminal connected to a lead 94 and normally closed contacts 96 of the remote battery jack 98. Positive DC voltage output is provided at lead 100 for distribution through the circuitry. The common lead 92 may be connected through motor control switch 20 to the ground buss 30 such that common buss 92 is grounded to the remainder of the circuit only when motor control switch 20 is properly actuated.

The control circuits 14 derive control signal energy through a magnetic pickup 102 which, in the case of a dual-channel record tape, would be aligned adjacent information playback head 28. The control tone may be such as an alternating signal at an optimum frequency, e.g. 1,500 c.p.s. Playback head 102 is biased from ground lead 30 by means of a resistor 104 and its output is applied through a coupling capacitor 106 to the base of an NPN-type transistor 108. The base of transistor 108 is connected through a capacitor 110 to ground which is also common to the emitter, and the base is biased through a resistor 112 to the collector which is further connected through a load resistor 114 and lead 116 to series load resistor 118 and the DC voltage supply input 120. Amplified output from transistor 108 is applied directly from the collector of transistor 108 to the base of an NPN-type transistor 122. Transistor 122 has its emitter biased through a resistor 124 and parallel-connected filter capacitor 126 to ground, while the collector is connected through a load resistor 128 to the DC lead 116.

An output is derived from the collector of transistor 122 for connection through a coupling capacitor 130 to the base of an NPN-type transistor 132, the base being biased above ground by a base resistor 134. The transistor 132 is connected as an emitter follower with the collector tied directly to the DC voltage supply input 120 to provide an emitter output on lead 136 which is biased through a load resistor 138 to ground lead 30. A capacitor 140 is connected in parallel with resistor 138 to receive charge buildup for the purpose of energizing gate electrode 142 of a semiconductive controlled rectifier 144. The semiconductive controlled rectifier 144, for example a conventional SCR unit, has the anode connected to a lead 146 which connects through a resistor 148 to the DC supply input 120, and the cathode of controlled rectifier 144 is coupled directly to ground lead 30. A trigger voltage release device is provided by a normally open pushbutton switch 150, the restart switch, which is connected in parallel across the semiconductive controlled rectifier 144.

Voltage on lead 146 is applied from the DC supply through a series resistor 152 to the base of an NPN-type transistor 154. The base of transistor 154 is biased by means of a resistor 156 to ground and the emitter is coupled directly to ground through a lead 158. The collector is connected via a lead 160 to control switch 22 which, in turn, effects control or voltage energization of drive motor 18. One form of the invention finds control switch 22 actuated closed in response to an "on" conduction in transistor 154 such that "cutoff" of transistor 154 serves to open control switch 22 and remove energization power to drive motor 18. This, of course, is a matter of choice depending only upon the type of binary device employed as control switch 22.

OPERATION

While the control circuitry 10 may be utilized with various forms of tape transport, or even two such tape transports, it is contemplated with regard to the present disclosure that it be employed in playback of a dual-channel tape for purposes of automatic instruction at a variable rate depending upon a student's capabilities. Thus, a dual-channel record will consist of an information channel and a control-signal channel. The information channel will consist of a series of information sequences each such sequence presenting a certain length and content of instructional material for audible dissemination to the student or students; and at the end of each segment a control signal tone is present on the control channel of the record, which signal is utilized to stop the tape transport until such time as it is reactuated by the student for reception of the next following information segment. The information segment may include instructional material as well as a direction as to answering activity or response by the student, and, in due time as required by each individual student, the transport can be restarted to proceed to the next following information segment.

Upon initial starting, tutorial information is played back through playback head 28 and amplified through transistors 36, 56 and output amplifier transistor 72 whereupon it is present across serial load resistors 78 and 80 in parallel with respective output jacks 86 and 88. Either one or both of output jacks 86 and 88 may be utilized for the purpose of audible reproduction of the information. The information output will continue through to conclusion of a particular segment at which time a control signal or tone recorded on the other record channel will be transduced via playback head 102 for amplification and actuation of control rectifier 144. Thus, as the amplified control tone brings about conduction in emitter follower transistor 132, a charge buildup is experienced at capacitor 140 whereupon the voltage rises to the triggering level at gate electrode 142 to fire the semiconductive controlled rectifier 144 such that lead 146 is effectively grounded. The grounding of lead 146 then removes the high-voltage biasing at the base of transistor 154 such that it is cut off from conduction to release control switch 22 such that DC power is disallowed from entering voltage regulator 26. This, in turn, removes the output from voltage regulator 26 through motor control switch 20 such that there is no energization to drive motor 18 and the tape transport is stopped.

At this point, the student makes his response gestures, writings, or whatever, and in such time as his learning pace requires, whereupon he depresses the restart pushbutton 150. Depression of restart switch 150 provides a direct ground across semiconductive controlled rectifier 144 to cease current flow through trigger electrode 142 thereby to allow controlled rectifier 144 to return to its current-blocking state such that an increased DC voltage on lead 146 is present on the base of transistor 154. Such biasing enables full conduction of transistor 154 so that control switch 22 is once again placed in the "on" position. Thus, the "on" position of control switch 22 allows DC voltage from input 24 to be applied to voltage regulator 26 and the forward-reverse motor control switch 20 to energize the drive motor 18 through the next information sequence.

The foregoing discloses novel teaching apparatus which allows presentation of a series of information segments to a student so that he receives and reacts in whatever the time required for his particular grade level or learning ability. The teaching machine actually serves as a pacing device for presentation of information to any of various students and it may be employed without regard to their respective intelligence capabilities. The control circuitry of the present invention enables such selected presentation of information by means of economical and reliable structure which is relatively foolproof as regards the various capabilities and types of operator which will handle the equipment during its useful life.

Changes may be made in the combination and arrangement of elements as heretofore set forth in the specification and shown in the drawings; it being understood that changes may be made in the embodiments disclosed without departing from the spirit and scope of the invention as defined in the following claims.

What I claim is:

1. Electrical circuitry for control of dual-channel record playback device having a series of information sequences recorded on a first channel, and having a control signal recorded on a second channel at intermittent spacings which denote the end of an information sequence on said first channel, the circuitry comprising:

first playback means supported by said playback device in transducing contact with said record first channel and providing an information signal output;

second playback means supported by said playback device in transducing contact with said record second channel and intermittently providing a control signal output;

first amplifier means receiving said information signal output from said first playback means to provide amplified audio output signal;

reproducing means receiving said audio output signal and providing an audible output;

second amplifier means receiving said control signal output from said playback means at predetermined intervals to generate a control actuation signal;

a DC bias source;

transistor means having the base connected to said DC bias source thereby biasing said transistor means to conduction, and said transistor means having the collector connected to provide an enabling output when in conduction;

a DC power source;

voltage regulator means to provide DC drive power output;

control switch means connected to the collector enabling output of said transistor means and enabled by conduction of said transistor means to apply DC energizing power from said DC power source to said voltage regulator means;

drive motor means driving said record playback device;

motor control switch means connected to apply said DC drive power output from said voltage regulator means to energize said drive motor means for selective forward and reverse energization; and semiconductive controlled rectifier means having the anode connected to said DC-bias source, the cathode connected common, and the gate electrode connected to receive said control actuation signal from said second amplifier means causing conduction of said controlled rectifier means to short said DC-bias source and cut off conduction of said transistor means thereby to deenergize said drive motor means.

2. The electrical circuitry as set forth in claim 1 which is further characterized to include:

normally open pushbutton switch means which is connected in parallel with said semiconductive controlled rectifier means between said biased base of the transistor means and common.